US012304799B2

(12) United States Patent
Junge et al.

(10) Patent No.: US 12,304,799 B2
(45) Date of Patent: May 20, 2025

(54) BEVERAGE-DISPENSING APPLIANCE HAVING A CHILLED CARBONATOR

(71) Applicant: Haier US Appliance Solutions, Inc., Wilmington, DE (US)

(72) Inventors: Brent Alden Junge, Evansville, IN (US); Danister Abeygunawardana, Jeffersonville, IN (US); Gregory Scott Carr, Louisville, KY (US); Jordan Andrew Waymeyer, Louisville, KY (US); Timothy Ray Jackson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 876 days.

(21) Appl. No.: 17/491,670

(22) Filed: Oct. 1, 2021

(65) Prior Publication Data

US 2023/0108527 A1 Apr. 6, 2023

(51) Int. Cl.

*B67D 1/00* (2006.01)
*B67D 1/08* (2006.01)
*F25D 1/02* (2006.01)

(52) U.S. Cl.

CPC ......... *B67D 1/0068* (2013.01); *B67D 1/0069* (2013.01); *B67D 1/0857* (2013.01); *F25D 1/02* (2013.01); *B67D 2210/00104* (2013.01)

(58) Field of Classification Search

CPC ... B67D 1/0068; B67D 1/0069; B67D 1/0857
See application file for complete search history.

(56) References Cited

U.S. PATENT DOCUMENTS

| | | | | |
|---|---|---|---|---|
| 3,638,448 A | | 2/1972 | Raymer | |
| 3,721,369 A | * | 3/1973 | Conti et al. | B01F 23/236 222/67 |
| 3,926,342 A | * | 12/1975 | Selvia | B67D 1/0068 261/153 |
| 3,979,024 A | * | 9/1976 | Hoppe | B67D 1/0857 137/574 |
| 4,742,939 A | * | 5/1988 | Galockin | B67D 1/0074 366/137 |

(Continued)

FOREIGN PATENT DOCUMENTS

| | | |
|---|---|---|
| CN | 109422342 A | 3/2019 |
| CN | 209951070 U | 1/2020 |

(Continued)

*Primary Examiner* — Sean M Michalski
(74) *Attorney, Agent, or Firm* — Dority & Manning, P.A.

(57) ABSTRACT

A beverage-dispensing appliance may include a carbonation tank, a carbonator jacket, a cold water line, and an ice bin. The carbonation tank may define a tank volume, a water inlet upstream from the tank volume, a carbon dioxide inlet upstream from the tank volume, and a carbonated water outlet downstream from the tank volume. The carbonator jacket may define a jacket volume disposed about the carbonation tank. The cold water line may extend to the carbonator jacket in upstream fluid communication with the tank volume to direct a cold water flow to the tank volume. The ice bin may be spaced apart from the carbonation tank. The ice bin may define a drain aperture upstream from the cold water line to direct melt water thereto.

18 Claims, 12 Drawing Sheets

(56) References Cited

U.S. PATENT DOCUMENTS

| | | | | | |
|---|---|---|---|---|---|
| 5,190,189 | A * | 3/1993 | Zimmer | B67D 1/0068 261/DIG. 7 |
| 5,228,312 | A * | 7/1993 | Williams | B67D 1/0862 62/390 |
| 5,280,711 | A * | 1/1994 | Motta | B67D 1/0857 62/177 |
| 5,353,958 | A * | 10/1994 | Hawkins | B67D 1/0857 222/54 |
| 5,492,250 | A * | 2/1996 | Sardynski | B67D 1/16 222/129.1 |
| 6,880,358 | B2 * | 4/2005 | Lucas | F25C 5/24 62/344 |
| 8,651,328 | B2 | 2/2014 | Cittadino | |
| 2013/0062366 | A1 * | 3/2013 | Tansey | B67D 1/0809 222/101 |
| 2014/0263413 | A1 * | 9/2014 | Green | B67D 1/0888 222/23 |
| 2015/0034674 | A1 * | 2/2015 | Hertensen | B67D 1/0801 222/145.5 |
| 2017/0043992 | A1 * | 2/2017 | Green | B67D 1/0864 |
| 2017/0349421 | A1 * | 12/2017 | Cleland | B67D 1/10 |
| 2019/0219338 | A1 | 7/2019 | Gan | |

FOREIGN PATENT DOCUMENTS

| | | | |
|---|---|---|---|
| KR | 200264493 | Y1 | 6/2002 |
| KR | 20090075068 | A | 7/2009 |
| KR | 101859952 | B1 | 5/2018 |

* cited by examiner

BEVERAGE-DISPENSING APPLIANCE HAVING A CHILLED CARBONATOR

FIELD OF THE INVENTION

The present subject matter relates generally to beverage dispensers, and more particularly to beverage dispensers having features for carbonated beverages.

BACKGROUND OF THE INVENTION

In home, restaurant, and office settings, it is common for multiple individual users to enjoy a wide variety of beverages. Such beverages may be hot or cold, flat or carbonated, flavored or unflavored, etc. For instance, coffee, tea, soft-drinks, vitamin/electrolyte drinks, purified chilled water, or hot water may all be desirable at various points in time. Currently, each type of beverage must be obtained from a different machine. At most, existing appliances permit one or two similar beverages (e.g., coffee and tea) to be generated at the same machine. If ice is desired, an entirely separate appliance (e.g., a dedicated icemaker or refrigerator) is often required. Moreover, typical existing appliances do not include features for providing carbonated beverages, which many users prefer to be chilled. Stand-alone carbonated beverage dispensers often rely on complex refrigeration assemblies (e.g., including a compressor and evaporator surrounding a carbonator) to cool carbonated water. Other appliances that provide both carbonated beverages and ice have, in the past, placed carbonators directly within an ice storage volume to cool carbonated water.

Such existing appliances present a number of drawbacks. For one, the number of machines required to prepare more than one or two beverages, let alone ice, is often prohibitive. Smaller offices or kitchens simply cannot dedicate space solely for the purpose of making a single beverage. In addition, the need to hard plumb some appliances further limits their usability or mounting location. In the case of appliances the can provide carbonated beverages, complex refrigeration assemblies may add undesirable costs and complexity for the appliance, and may be susceptible to failure. Placing a carbonator directly within an ice storage volume reduces the overall usable space for storing ice and may suffer from unpredictable or undesirable performance (e.g., by inadvertently freezing water within the carbonator).

As a result, it would be useful to provide an appliance having features for addressing one or more of the above-identified issues. In particular, it may be advantageous to provide an improved appliance for reliably dispensing chilled carbonated beverages (e.g., without requiring complex refrigeration assemblies or sacrificing ice storage). Additionally or alternatively, it may be advantageous to provide a space-efficient beverage-dispensing appliance that is free standing (e.g., that does not need to be directly plumbed to a separate water source).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a beverage-dispensing appliance is provided. The beverage-dispensing appliance may include a carbonation tank, a carbonator jacket, a cold water line, and an ice bin. The carbonation tank may define a tank volume, a water inlet upstream from the tank volume, a carbon dioxide inlet upstream from the tank volume, and a carbonated water outlet downstream from the tank volume. The carbonator jacket may define a jacket volume disposed about the carbonation tank. The cold water line may extend to the carbonator jacket in upstream fluid communication with the tank volume to direct a cold water flow to the tank volume. The ice bin may be spaced apart from the carbonation tank. The ice bin may define a drain aperture upstream from the cold water line to direct melt water thereto.

In another exemplary aspect of the present disclosure, a beverage-dispensing appliance is provided. The beverage-dispensing appliance may include a carbonation tank, a carbonator jacket, a cold water line, an ice bin, and a pump. A carbonation tank may define a tank volume, a water inlet upstream from the tank volume, a carbon dioxide inlet upstream from the tank volume, and a carbonated water outlet downstream from the tank volume. The carbonator jacket may define a jacket volume disposed about the carbonation tank. The jacket inlet may be upstream from the jacket volume. The jacket outlet may be downstream from the jacket volume. The jacket inlet being disposed above the jacket outlet. The cold water line may extend to the carbonator jacket in upstream fluid communication with the jacket inlet to direct a cold water flow to the tank volume. The ice bin may be spaced apart from the carbonation tank. The ice bin may define a drain aperture upstream from the cold water line to direct melt water thereto. The pump may be in downstream fluid communication with the jacket outlet to selectively motivate water from the tank volume.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
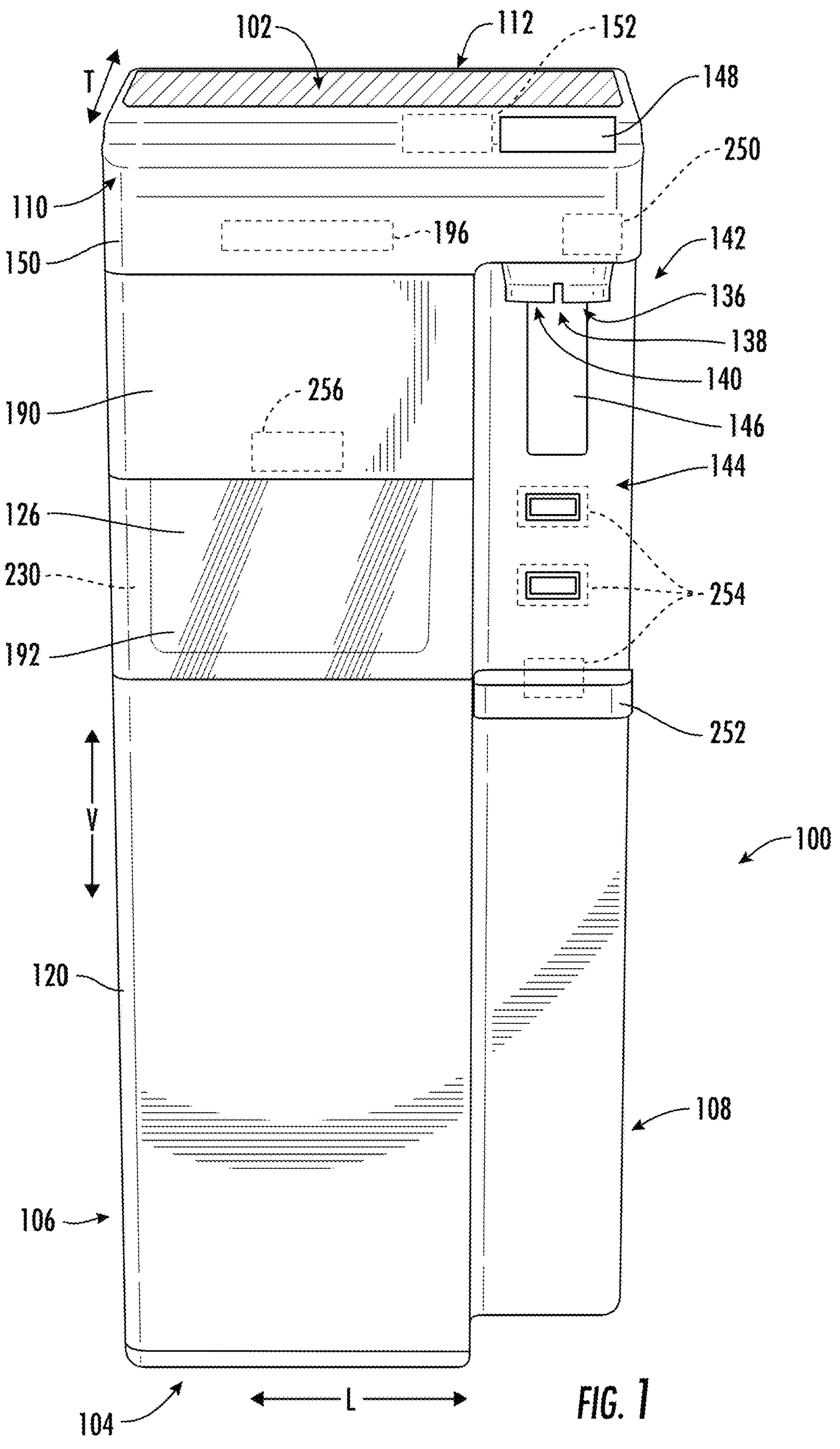
FIG. 1 provides a front perspective view of a beverage-dispensing appliance according to exemplary embodiments of the present disclosure.
Figure 2:
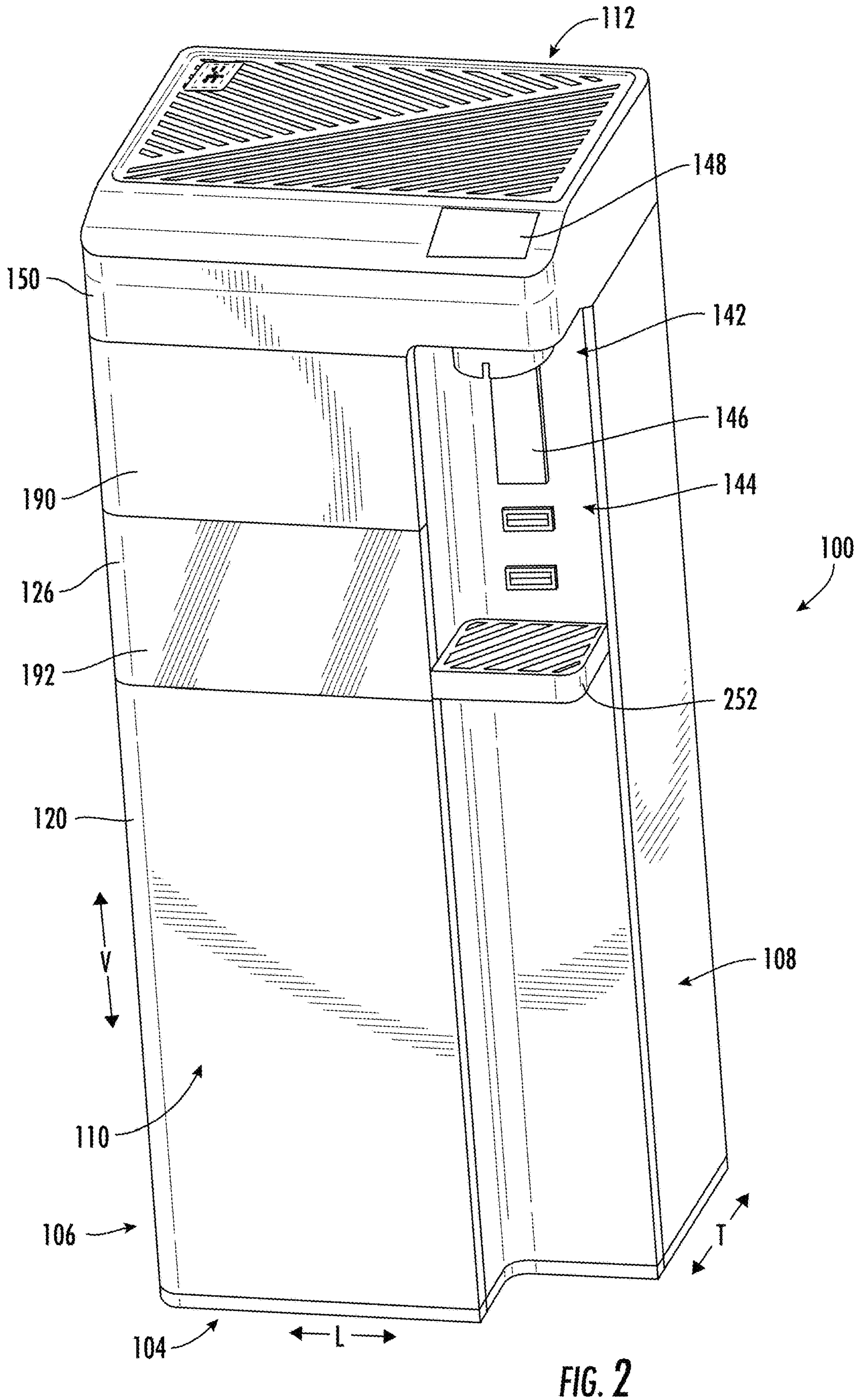
FIG. 2 provides a side perspective view of the exemplary beverage-dispensing appliance of FIG. 1.
Figure 3:
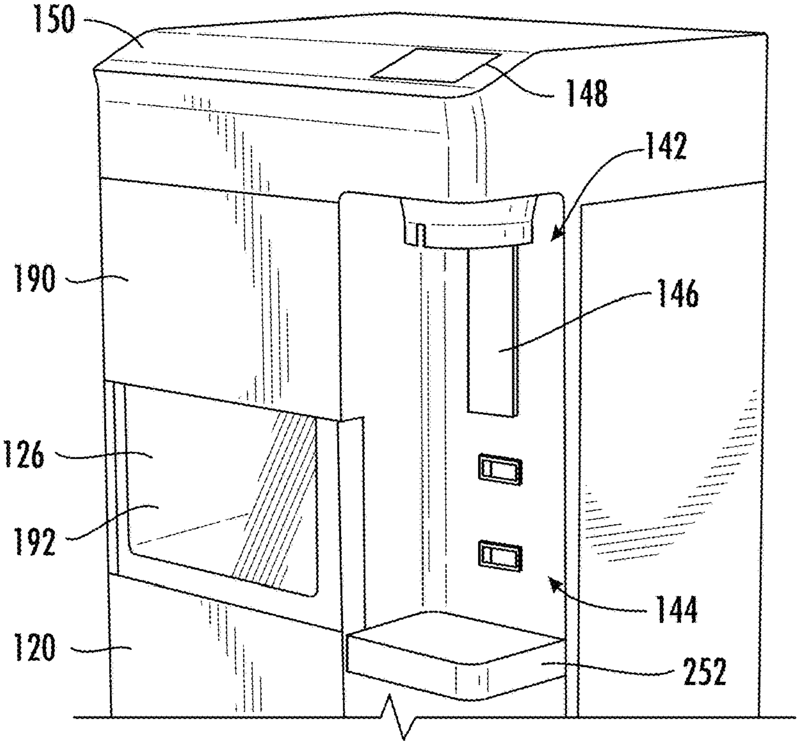
FIG. 3 provides a side perspective view of an upper portion of the exemplary beverage-dispensing appliance of FIG. 1.
Figure 4:
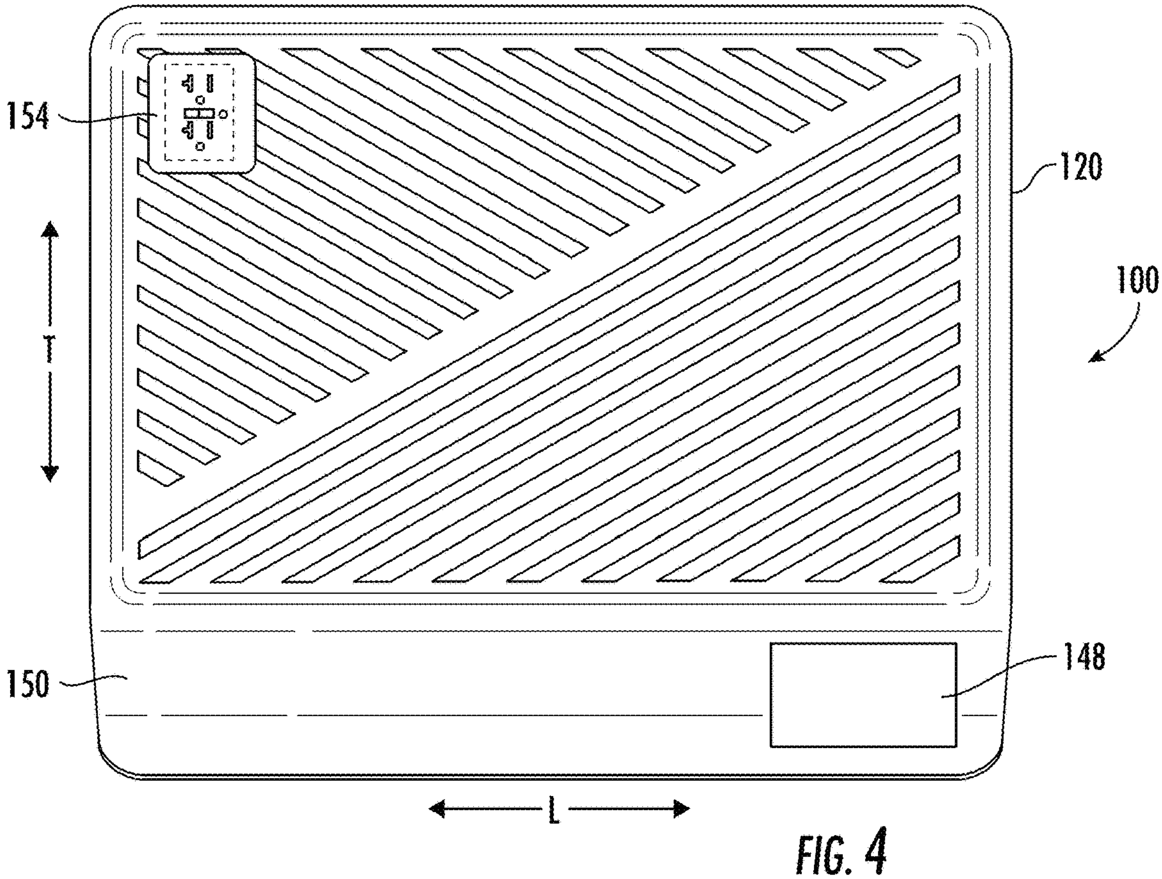
FIG. 4 provides a top plan view of the exemplary beverage-dispensing appliance of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Turning now to the figures, FIGS. 1 through 9 provide various views of a (e.g., free-standing) beverage-dispensing appliance 100, including certain portions thereof. Generally, beverage-dispensing appliance 100 includes a cabinet or housing 120 that extends between a top 102 and a bottom 104 along a vertical direction V; between a first side 106 and a second side 108 along a lateral direction L; and between a front 110 and a back 112 along a transverse direction T. Each of the vertical direction V, lateral direction L, and transverse direction T are mutually perpendicular and thus form an orthogonal direction system. In this regard, as used herein, the terms "cabinet," "housing," and the like are generally intended to refer to an outer frame or support structure for appliance 100 (e.g., including any suitable number, type, and configuration of support structures formed from any suitable materials, such as a system of elongated support members, a plurality of interconnected panels, or some combination thereof). It should be appreciated that cabinet 120 does not necessarily require an enclosure and may simply include open structure supporting various elements of appliance 100. By contrast, cabinet 120 may enclose some or all portions of an interior of cabinet 120. It should be appreciated that cabinet 120 may have any suitable size, shape, and configuration while remaining within the scope of the present subject matter. Moreover, although shown as a free-standing assembly, it is understood that the present disclosure may be equally applicable to another suitable appliance or configuration (e.g., refrigerator appliance, plumbed beverage appliance, etc.).

As will be described in greater detail below, cabinet 120 supports or houses various components of beverage-dispensing appliance 100 to produce ice or dispense one more liquids (e.g., carbonated beverages) using a water source. Optionally, and to that end, beverage-dispensing appliance may include a refillable internal water tank 122 (e.g., removably held within cabinet 120). For instance, an icemaker 124 may be mounted within cabinet 120 downstream from water tank 122 to receive water therefrom and form ice, which may supplied to a downstream ice bin 126 disposed within the cabinet 120. Additionally or alternatively, one or more water lines (e.g., a cold water line 130, a hot water line 132, or a carbonated water line 134) may be mounted to (e.g., within) cabinet 120 downstream from water tank 122 to selectively dispense liquid(s) from one or more corresponding outlets.

Beverage-dispensing appliance 100 includes a delivery assembly 142 for delivering or dispensing one or more liquids (e.g., from cold water outlet 136, hot water outlet 138, or carbonated water outlet 140). In some embodiments, a dispenser recess 144 is defined below one or more of the outlets 136, 138, 140. Additionally or alternatively, an actuating mechanism 146, shown as a paddle, may be mounted below the outlet(s) 136, 138, 140 (e.g., within dispenser recess 144) for operating delivery assembly 142. In alternative exemplary embodiments, any suitable actuating mechanism 146 may be used to operate delivery assembly 142. For example, delivery assembly 142 can include a sensor (such as an ultrasonic sensor) or a button rather than the paddle. In certain embodiments, a control panel 148 is provided (e.g., mounted to a top panel 150 of cabinet 120) for controlling the mode of operation. For example, control panel 148 may include a plurality of user inputs (not labeled), such as one or more buttons, knobs, or graphical user interfaces (e.g., presented on a touchscreen display) for selecting a desired mode of operation or beverage to be dispensed.

Operation of the beverage-dispensing appliance 100 can be regulated by a controller 152 that is operatively coupled to (i.e., in operable communication with) control panel 148 or various other components, as will be described below. Generally, in response to user manipulation of control panel 148 or one or more sensor signals, controller 152 may operate various components of the beverage-dispensing appliance 100. Controller 152 may include a memory and one or more microprocessors, CPUs or the like, such as general or special purpose microprocessors operable to execute programming instructions or micro-control code associated with operation of beverage-dispensing appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 152 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 152 may be positioned in a variety of locations throughout beverage-dispensing appliance 100. In the illustrated embodiments, controller 152 is located within top panel 150. In other embodiments, the controller 152 may be positioned at any suitable location within cabinet 120. Input/output ("I/O") signals may be routed between controller 152 and various operational components of beverage-dispensing appliance 100. For example, control panel 148 and delivery assembly 142 may be in communication with controller 152 via one or more signal lines or shared communication busses. Additionally or alternatively, controller 152 may be in communication with various other components of beverage-dispensing appliance 100. For example, various valves, switches, light sources, etc. may be actuatable based on commands from the controller 152. As discussed, control panel 148 may additionally be in communication with the controller 152. Thus, the various operations may occur based on user input or automatically through controller 152 instruction.

In optional embodiments, a power receptacle 154 having one or more electrical outlet plugs (e.g., standard 3-prong outlets) may be mounted to cabinet 120 (e.g., at top panel 150). An electrical device, such as a coffee grinder or phone charger, having a mating inlet plug may selectively connect and disconnect from power receptacle 154.

In some embodiments, beverage-dispensing appliance 100 is generally sized to fit within a fairly small room, such as an office breakroom, commercial kitchen, or in place of a so-called water cooler (i.e., fountain). Optionally, one or more casters or rollers 156 may be mounted to cabinet 120 (e.g., at the bottom 104) to support beverage-dispensing appliance 100 while permitting movement of the same.

Turning especially to FIGS. 1 and 7 through 9, icemaker 124 may be provided downstream from the water tank 122 to receive water therefrom for ice making operations. Icemaker 124 may be provided as any suitable ice making assembly (e.g., for forming nugget ice, cubed ice, shaved ice, etc.). In certain embodiments, icemaker 124 includes or is provided as nugget icemaker, and in particular is an auger-style icemaker 124. Nonetheless, other suitable styles of icemakers are within the scope of the present disclosure.

As shown, icemaker 124 may include a casing 160 into which water from water tank 122 is flowed (e.g., directly from water tank 122 through one or more conduits or indirectly from water tank 122, such as through one or more intermediate storage volumes). For instance, water may be motivated by an inline pump 162 in fluid communication with water tank 122. In the illustrated embodiments, a primary line 164 from water tank 122 feeds to a downstream ice assembly line 166 (e.g., as directed by one or more valves 158, 212 or pump 162).

As would be understood, an auger may be disposed at least partially within the casing 160. During operation, the auger may rotate. Water within the casing 160 may at least partially freeze due to heat exchange, such as with a refrigeration system 172 as discussed herein. The at least partially frozen water may be lifted by the auger from casing 160. Further, in exemplary embodiments, the at least partially frozen water may be directed by the auger to and through an extruder 168. The extruder 168 may extrude the at least partially frozen water to form ice, such as nuggets of ice, as would be understood.

Formed ice may be provided by the icemaker 124 to ice bin 126 and may be received in the bin volume defined by ice bin 126. For example, ice formed by the auger or extruder 168 may be provided to the ice bin 126. In exemplary embodiments, a chute 170 may be included for directing ice produced by the icemaker 124 towards the bin volume defined by ice bin 126. For example, as shown, chute 170 is generally positioned above ice bin 126 along the vertical direction V. Thus, ice can slide off of chute 170 and drop into ice bin 126. Chute 170 may, as shown, extend between icemaker 124 and ice bin 126, and may define a passage therethrough. Ice may be directed from the icemaker 124 (such as from the auger or extruder 168) through the passage of chute 170 to the ice bin 126. In some embodiments, for example, a sweep, which may for example be connected to and rotate with the auger, may contact the ice emerging through the extruder 168 from the auger and direct the ice through the passage of chute 170 to the ice bin 126.

As discussed, water within the casing 160 may at least partially freeze due to heat exchange, such as with a refrigeration system 172. In exemplary embodiments, icemaker 124 may include a sealed system. The sealed refrigeration system 172 may be in thermal communication with the casing 160 to remove heat from the casing 160 and the interior volume thereof, thus facilitating freezing of water therein to form ice. Sealed refrigeration system 172 may, for example, include a compressor 174, a condenser 176, an expansion device 178, and an evaporator 180. Evaporator 180 may, for example, be in thermal communication with the casing 160 in order to remove heat from the casing 160 and water therein during operation of refrigeration system 172. For example, evaporator 180 may at least partially surround the casing 160. In particular, evaporator 180 may be a conduit coiled around and in contact with casing 160, such as the sidewall(s) thereof.

During operation of refrigeration system 172, refrigerant exits evaporator 180 as a fluid in the form of a superheated vapor or vapor mixture. Upon exiting evaporator 180, the refrigerant enters compressor 174 wherein the pressure and temperature of the refrigerant are increased such that the refrigerant becomes a superheated vapor. The superheated vapor from compressor 174 enters condenser 176 wherein energy is transferred therefrom and condenses into a saturated liquid or liquid vapor mixture. This fluid exits condenser 176 and travels through expansion device 178 that is configured for regulating a flow rate of refrigerant therethrough. Upon exiting expansion device 178, the pressure and temperature of the refrigerant drop at which time the refrigerant enters evaporator 180 and the cycle repeats itself. In certain exemplary embodiments, expansion device 178 may be a capillary tube or electronic expansion valve. Notably, in some embodiments, refrigeration system 172 may additionally include fans (not shown) for facilitating heat transfer to/from the condenser 176 or evaporator 180.

As noted above, ice may be received within the downstream ice bin 126. For instance, ice bin 126 may define a bin opening 182 (e.g., at the top end of ice bin 126) to permit ice therethrough. In some embodiments, a drain aperture 184 is defined at a bottom end of ice bin 126. For instance, drain aperture 184 may be defined through a base wall of ice bin 126 above a discrete melt water storage volume 186. Ice held within ice bin 126 may gradually melt. Drain aperture 184, may advantageously drain melt water away from ice bin 126. In some embodiments, one or more conduits may extend from the melt water storage volume 186 (e.g., as will be described in detail below). For instance, one or more conduits or lines may direct melt water from the melt water storage volume 186 to a secondary reservoir upstream from the icemaker 124. Thus, the melt water may be reused by beverage-dispensing appliance 100 to form ice. Optionally, one or more sanitizers 188 [e.g., ultraviolet (UV) light assembly or fluid filtration assembly] may be placed along the flow path from the melt water storage volume 186 to sanitize melt water before it is used to make ice or directed to another line within appliance 100.

In some embodiments, ice bin 126 is mounted (e.g., removably or fixedly) to cabinet 120 below top panel 150. A bin door 190 may be movably (e.g., rotatably or slidably) mounted on cabinet 120 to selectively permit access to the bin volume of ice bin 126. In the illustrated embodiments, bin door 190 is rotatably mounted to cabinet 120 above ice bin 126. Specifically, bin door 190 is disposed above bin opening 182 such that a user may selectively open bin door 190 and reach down to access ice within ice bin 126 though bin opening 182.

In exemplary embodiments, at least one wall (e.g., front sidewall 192) of ice bin 126 may be visible from outside cabinet 120. For instance, the front sidewall 192 may fit within a corresponding opening in an outer panel of cabinet 120. Additionally or alternatively, the front sidewall 192 may be formed from a clear, see-through (i.e., transparent or translucent) material, such as a clear glass or plastic, such that a user can see into the storage volume of ice bin 126 and thus view ice therein. One or more internal sidewalls 194 may extend from the front sidewall 192 and be spaced apart from an inner surface of cabinet 120.

In optional embodiments, a light source 196 is mounted within the cabinet 120. Generally, during operation, light source 196 may selectively emit or direct light into ice bin 126, illuminating any ice therein. Light source 196 may include a suitable light-emitting element, such as one or more fluorescent bulbs or light emitting diodes (LEDs). In exemplary embodiments, light source 196 is positioned above bin opening 182. For instance, light source 196 may be mounted to a bottom surface of top panel 150 above bin door 190. Along with illuminating ice bin 126 when bin door 190 is closed, light source 196 may provide illumination for a user when bin door 190 is open, such that a user can see the contents of ice bin 126.

Figure 6:
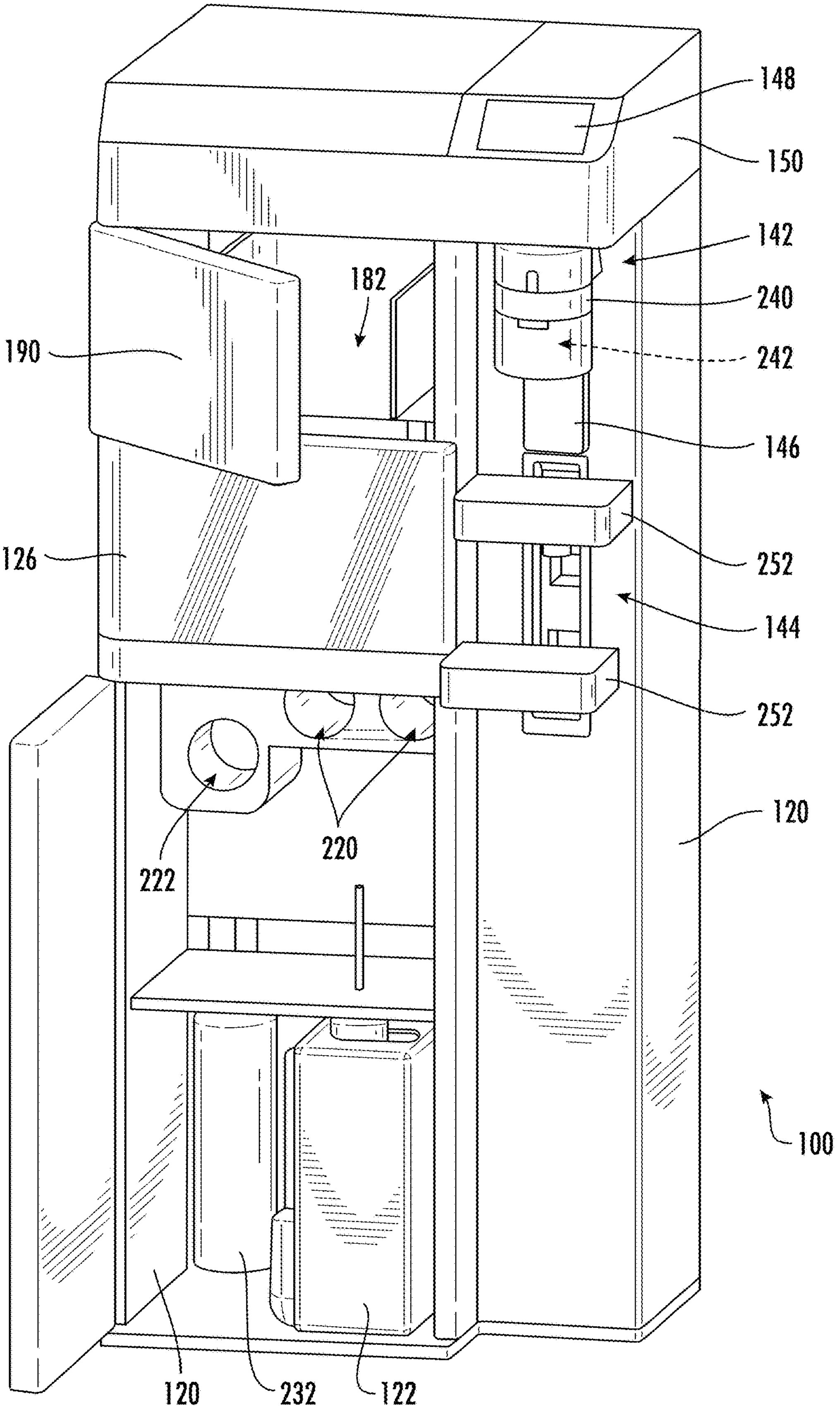
FIG. 6 provides a side perspective view of the exemplary beverage-dispensing appliance of FIG. 5, wherein multiple door have been opened for the purposes of clarity.
Figure 7:
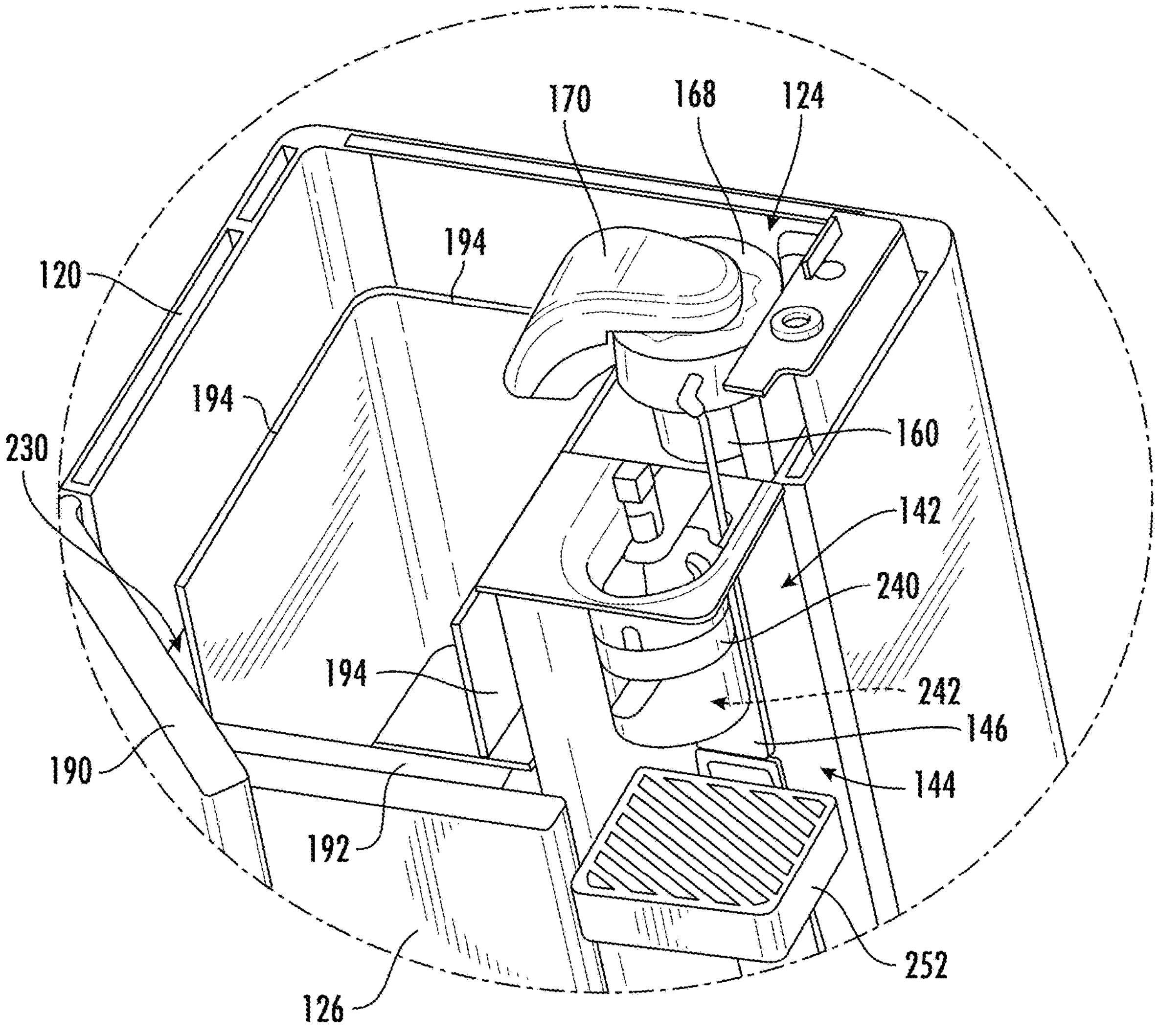
FIG. 7 provides a side perspective view of a top portion of the exemplary beverage-dispensing appliance of FIG. 6, wherein a top panel has been removed for the purposes of clarity.
Figure 8:
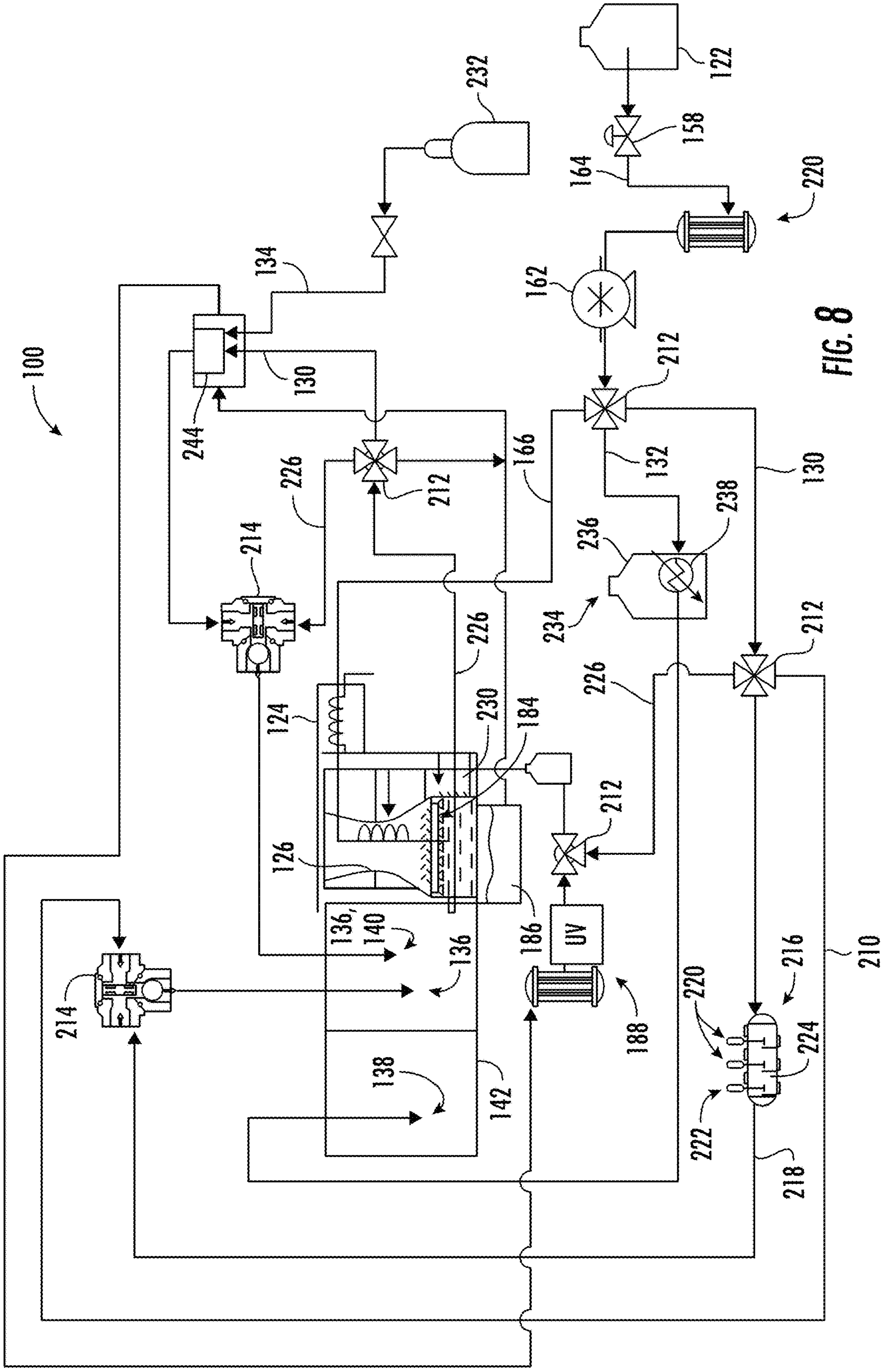
FIG. 8 provides a schematic view of the exemplary beverage-dispensing appliance of FIG. 1 illustrating the flow paths of fluids within the beverage-dispensing appliance.
Figure 9:
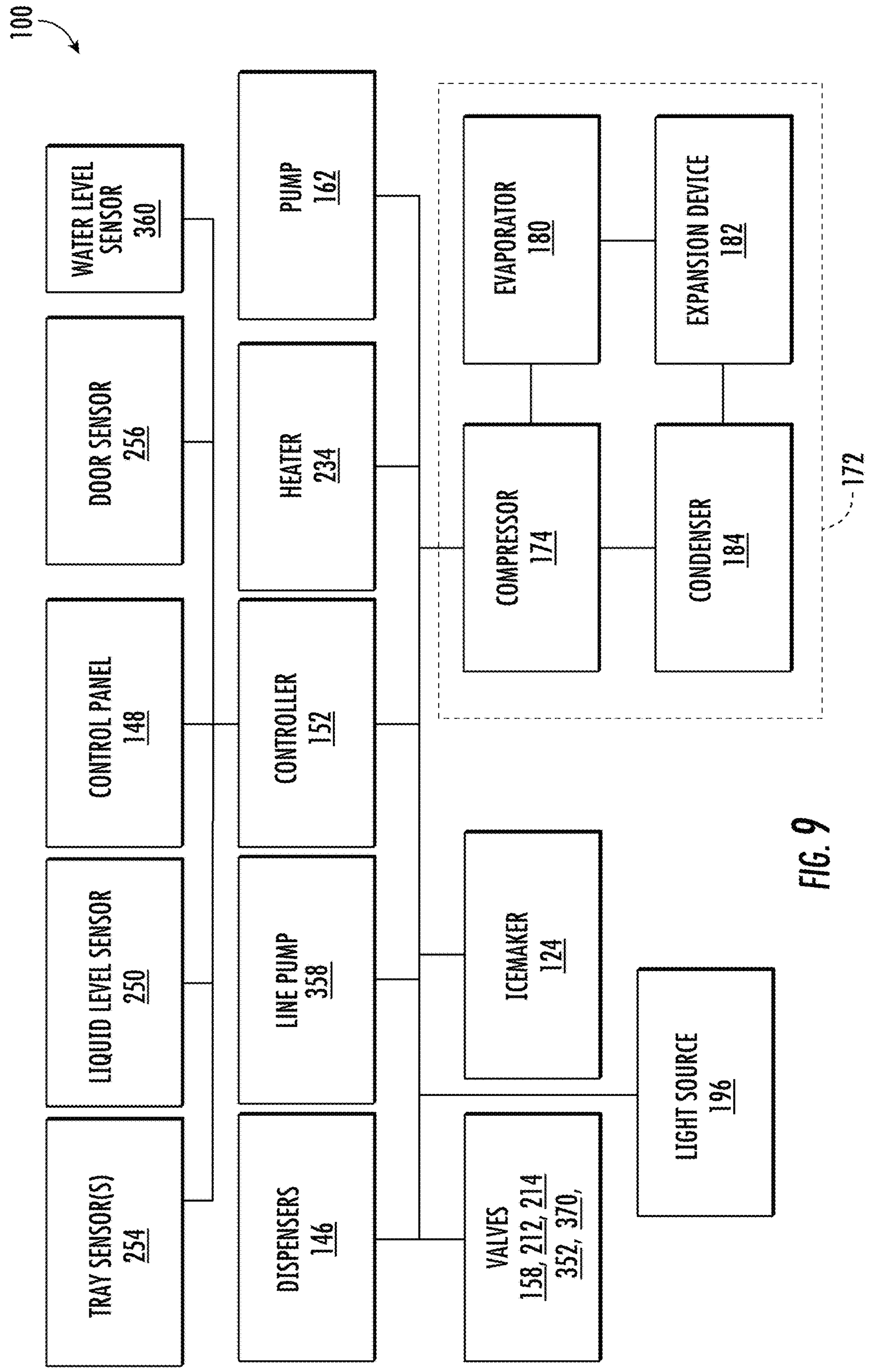
FIG. 9 provides a schematic view of the exemplary beverage-dispensing appliance of FIG. 1 illustrating various connections within the beverage-dispensing appliance.
Figure 10:
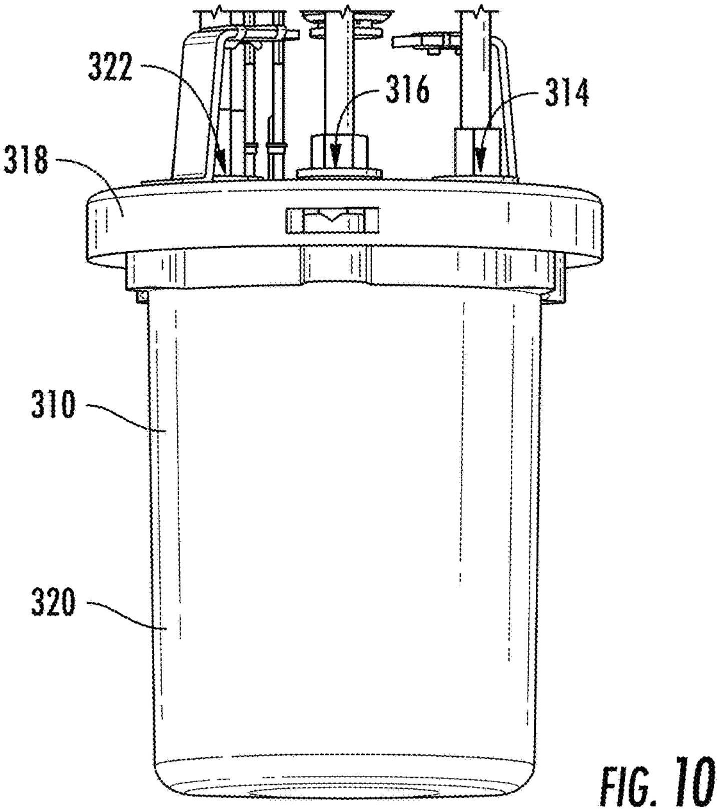
FIG. 10 provides a perspective view of a carbonation tank, in isolation, of a beverage-dispensing appliance according to exemplary embodiments of the present disclosure.
Figure 11:
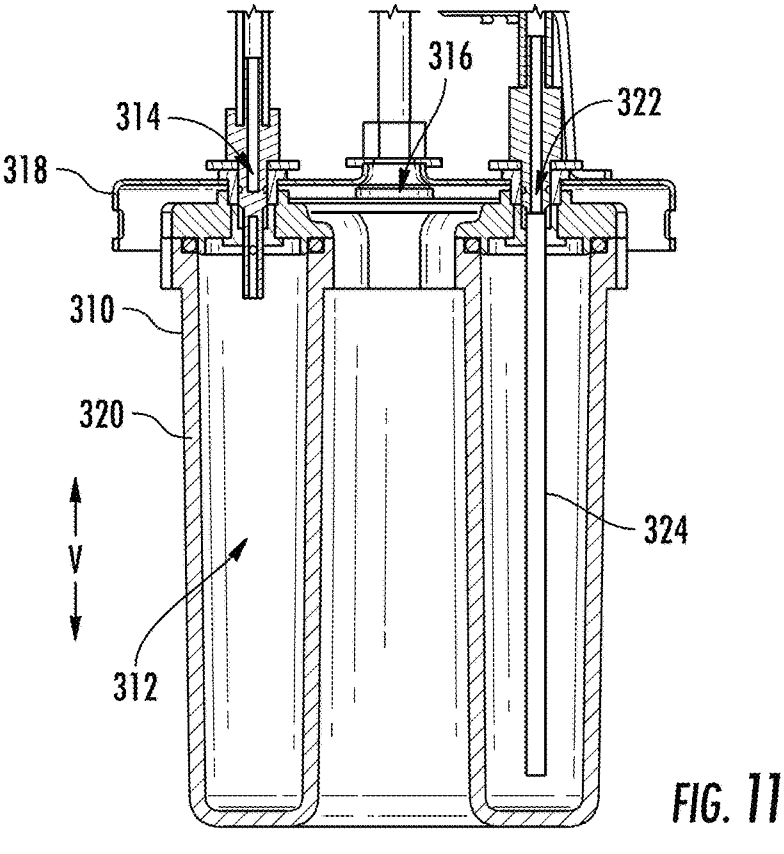
FIG. 11 provides a cross-sectional elevation view of the exemplary carbonation tank of FIG. 10.

Turning especially now to FIGS. 1, 6, and 8, one or more cold water lines 130 are provided within cabinet 120. For instance, from primary line 164, cold water line 130 may extend (e.g., along one or more parallel or connected branches) to one or more cold water outlets 136 disposed at dispenser. As shown, an untreated branch 210 of cold water line 130 may extend from a multi-path valve 212 to an outlet port 214 defining a cold water outlet 136 above dispenser recess 144. Water flowing from water tank 122 to cold water line 130 may be directed by one or more valves 158, 212 or pump 162.

In certain embodiments, a water treatment assembly 216 is provided along cold water line 130. Generally, water treatment assembly 216 may provide one or more units for filtering out or incorporating in one or more elements into water through cold water line 130. Such units may be provided in stages along a treated branch 218 of cold water line 130 (e.g., downstream of a multi-path valve 212) upstream of outlet port 214 defining a cold water outlet 136. For instance, water treatment assembly 216 may include one or more filtration stages 220 containing a filtration media (e.g., a paper filter cartridge, activated carbon, a mixed-bed media of commingled anion and cation resin, etc.). Additionally or alternatively, one or more additive stages 222 containing a water additive (e.g., electrolyte solute or mixture, flavor syrup, pH adjuster or alkaline additive, etc.) may be provided. In particular, an additive cartridge 224 holding the water additive may be selectively disposed on or received at additive stage 22. Thus, as water is flowed through at least a portion of cold water line 130 (e.g., treated branch 218), such water may be filtered or intermixed with a water additive prior to being dispensed (e.g., from a cold water outlet 136). Optionally, treated water may further mix with untreated water prior to being dispensed. For instance, untreated branch 210 and treated branch 218 may terminate at a common outlet port 214 upstream of a cold water outlet 136.

In additional or alternative embodiments, at least a portion of cold water line 130 may be chilled (e.g., to draw heat from or otherwise cool water within that portion of cold water line 130). For instance, a chilled branch 226 of cold water line 130 may be provided upstream of a corresponding cold water outlet 136 (e.g., downstream of a multi-path valve 212).

Optionally, a passive or active chiller is provided along chilled branch 226. In some embodiments, a cooling jacket 230 is provided as a passive chiller to cool water within chilled branch 226. Specifically, cooling jacket 230 may define at least a portion of chilled branch 226. Moreover, cooling jacket 230 may extend along at least a portion of ice bin 126. In some such embodiments, cooling jacket 230 is disposed between one or more internal sidewalls 194 of ice bin 126 and an inner surface of cabinet 120. Specifically, cooling jacket 230 may be in conductive thermal communication with ice bin 126. Thus, heat from cooling jacket 230 (e.g., water therein) may gradually be conducted to ice bin 126 such that ice within ice bin 126 is able to cool water within cooling jacket 230. Optionally, one or more valves (e.g., multi-path valves 212) are disposed upstream from cooling jacket 230 such that a predefined volume of water may generally be held within cooling jacket 230 to ensure a steady supply of chilled water (e.g., at a cold water outlet 136).

In further additional or alternative embodiments, a carbonated water line 134 is provided downstream from water tank 122. Specifically, carbonated water line 134 may be provided in fluid isolation from a hot water line 132. In some embodiments, carbonated water line 134 is downstream of cold water line 130 (e.g., at chilled branch 226). Optionally, carbonated water line 134 terminates at an outlet port 214 defining a cold water or carbonated water outlet 140. In certain embodiments, the carbonated water outlet 140 is in fluid isolation from at least one cold water outlet 136 (e.g., even though it may alternately serve as a separate cold water outlet 136). For instance, chilled branch 226 and carbonated water line 134 may terminate at a common outlet port 214 that defines or is upstream of a cold and carbonated water outlet 136, 140.

Generally, a carbon dioxide tank 232 (e.g., mounted within cabinet 120) is disposed in selective communication with carbonated water line 134 to carbonate at least a portion of the water therein. For instance, a carbonation tank 244 may be provided along carbonated water line 134 in downstream fluid communication with carbon dioxide tank 232. Thus, carbon dioxide tank 232 may be selectively provide $CO_2$ to carbonate water prior to being dispensed.

Turning especially now to FIGS. 1 and 5 through 9, in addition to cold water line 130, one or more hot water lines 132 may be provided within cabinet 120. For instance, from primary line 164, hot water line 132 may extend to one or more hot water outlets 138 disposed at delivery assembly 142. As shown, although hot water line 132 and cold water line 130 may both be downstream from water tank 122, hot water outlet 138 may be in fluid isolation from each cold water outlet 136. Water flow from water tank 122 to hot water line 132 may be directed by one or more valves 158, 212 or pump 162.

In some embodiments, a heating element or heater 234 is provided along the hot water line 132 to selectively heat water upstream from hot water outlet 138. In some embodiments, a heater tank 236 is disposed within cabinet 120 upstream from hot water outlet 138 (e.g., along hot water line 132). Heater tank 236 may generally define an enlarged volume that is less than that of water tank 122. Thus, a suitable volume of hot water may be held or maintained within heater tank 236. In certain embodiments, heater 234 is provided as or includes an electric heater element 238 (e.g., resistive heating wire, resistive thermal element, such as a CALROD®, an inductive heating element, etc.) mounted within heater tank 236 (e.g., to selectively heat the water therein). During use, electric heater element 238 may thus be selectively activated (e.g., by controller 152) to generate or maintain a volume of water between, for instance, 160° Fahrenheit and 210° Fahrenheit.

In some embodiments, a brew module 240 is provided to aid in the generation or dispensing of one or more hot beverages. For instance, brew module 240 may define a brew chamber 242 in which a brew pod (e.g., sealed, disposable cup, or reusable mesh cup) may be received downstream from hot water outlet 138. In some embodiments, brew module 240 is mountable within dispenser recess 144 such that brew module 240 can be in fluid communication with hot water outlet 138 when mounted within dispenser recess 144. For example, when brew module 240 is installed on delivery assembly 142, an inlet of the brew module 240 may receive a water delivery tube to receive heated water therethrough. During use, heated water from the heater tank 236 may thus flow into the brew chamber 242. Within brew module 240, heated water may mix with, dissolve, or extract portions of a particulate material (e.g., held in a brew pod) to form a liquid beverage (e.g., a liquid coffee or tea solution), which may then exit brew module 240 through an outlet defined through brew module 240.

Turning now especially to FIGS. 1, 3, 5, and 6, beverage-dispensing appliance 100 may further include a liquid level sensor 250 to detect a level of liquid within a cup or container below cold water outlet 136, hot water outlet 138, or carbonated water outlet 140. In some embodiments, liquid level sensor 250 is mounted above the dispenser recess 144 to detect a height of liquid dispensed to a container from the cold water outlet 136. For instance, liquid level sensor 250 may be in communication with controller 152 and operable to measure the height of a liquid within the corresponding container. In exemplary embodiments, liquid level sensor 250 can be any suitable device for detecting or measuring distance to an object. For example, liquid level sensor 250 may be an ultrasonic sensor, an infrared sensor, or a laser range sensor. Controller 152 can receive a signal, such as a voltage or a current, from liquid level sensor 250 that corresponds to the detected presence of or distance to a liquid within the corresponding container. Based on the received signal, controller 152 can initiate or direct an auto-fill sequence. Specifically, controller 152 can determine the height of dispensed liquids within a corresponding container to ensure a predetermined level or dispensed volume is provided to the corresponding container.

Figure 5:
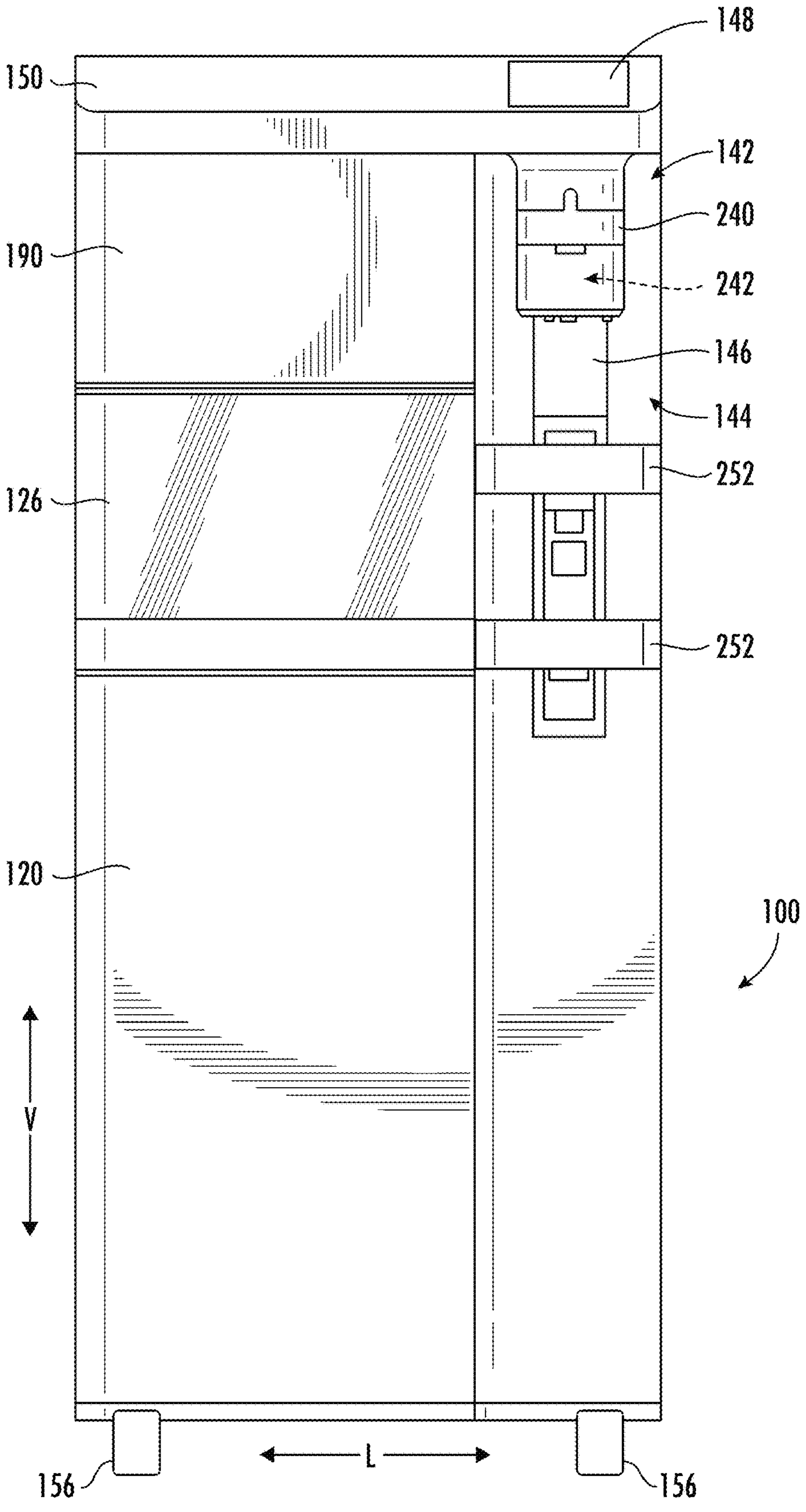
FIG. 5 provides an elevation view of the exemplary beverage-dispensing appliance of FIG. 1, wherein a removable brew module, additional tray, and roller set have been illustrated for the purposes of clarity.

In optional embodiments, liquid level sensor 250 can work in tandem with one or more other sensors to control the auto-fill sequence. As an example, in certain embodiments, a movable container tray 252 is provided to support a container below delivery assembly 142 (for the purposes of illustration, two trays 252 are shown in FIGS. 5 and 6). Movable container tray 252 may be selectively mounted to cabinet 120 at a plurality of predetermined discrete heights along the vertical direction V. For instance, each discrete height may provide or define a separate receiving index (e.g., post, recess, clip, etc.) on which movable container tray 252 may be mounted. At each discrete height a separate fixed tray sensor 254 (e.g., reed switch, Hall effect sensor, pressor sensor, etc.) may be provided to detect the presence of movable container tray 252. In some such embodiments, controller 152 may be configured to receive a signal from the fixed tray sensor 254 at which movable container tray 252 is mounted, and further direct the auto-fill sequence based on the same. For instance, controller 152 may the use the tray sensor signal to detect a distance between the movable container tray 252 and the liquid level sensor 250, and thus estimate a base height of the container that is to be filled.

As an additional or alternative example, one or more sensors may be provided to selectively halt or prevent an auto-fill sequence from proceeding. In some such embodiments, a door sensor 256 is mounted to cabinet 120 in selectively engagement with door. For instance, door sensor 256 may generally detect when bin door 190 is moved away from the closed position and transmit/halt a signal to controller 152 in response to the same. To that end, door sensor 256 may include any suitable physical detection sensor (e.g., reed switch, Hall effect sensor, pressor sensor, etc.) to selectively engage with bin door 190 in the closed position. In response to placement of the bin door 190 away from the closed position, door sensor 256 may thus transmit a door ajar signal to the controller 152. In response to receiving the door ajar signal, the controller 152 is may halt or prevent the auto-fill sequence.

Advantageously, beverage-dispensing appliance 100 may supply and dispense multiple types of beverages within a relatively small or unplumbed assembly. Additionally or alternatively, one or more beverage may be efficiently generated or supplied within close proximity to generated ice (e.g., without requiring a full refrigerator appliance).

Turning now generally to FIGS. 10 through 14, various views are provided of a carbonator assembly 300, including a carbonation tank 310 and other portions thereof, according to exemplary embodiments. As would be understood in light of the present disclosure, carbonator assembly 300 may be provided along a carbonated water line 134 (FIG. 8) to generate or supply carbonated water, such as might be dispensed at carbonated water outlet 140 for or as part of a carbonated beverage (e.g., in isolation or in combination with one or more additive). For instance, carbonation tank 310 may be provided as or as part of carbonation tank 244 (FIG. 8).

As illustrated, carbonation tank 310 generally defines a tank volume 312 (i.e., primary volume) within which water may mix with $CO_2$ to generate carbonated water. Along with the tank volume 312, carbonation tank 310 thus defines a water inlet 314 and a carbon dioxide inlet 316. Both water inlet 314 and carbon dioxide inlet 316 may be defined upstream from the tank volume 312. For instance, water inlet 314 and carbon dioxide inlet 316 may be defined in fluid parallel to each other. In the illustrated embodiments, water inlet 314 and carbon dioxide inlet 316 are defined at an upper end of carbonation tank 310. Optionally, one or both of the inlets 314, 316 may be defined through a tank cap 318 mounted to a tank body 320 of carbonation tank 310. Water inlet 314 and carbon dioxide inlet 316 may further be spaced apart from each other (e.g., horizontally). As would be understood in light of the present disclosure, water inlet 314 may be defined or mounted downstream from a water supply (e.g., water tank 122—FIG. 8), water line (e.g., cold water line 130—FIG. 8), or water chiller (e.g., cooling jacket 230—FIG. 8) to receive water therefrom. As would be further understood in light of the present disclosure, carbon dioxide inlet 316 may be defined or mounted downstream from a $CO_2$ tank (e.g., carbon dioxide tank 232—FIG. 8) to receive $CO_2$ therefrom.

Separate from or in addition to the water inlet 314 and carbon dioxide inlet 316, a carbonated water outlet 322 may be defined downstream from tank volume 312. For example, carbonated water outlet 322 may be defined through tank cap 318. Moreover, carbonated water outlet 322 may be spaced apart from one or both of the inlets 314, 316 (e.g., horizontally). Optionally, a feed straw 324 may extend (e.g., vertically) through tank volume 312 to carbonated water outlet 322. In turn, carbonated water may be drawn through feed straw 324 to carbonated water outlet 322 from a lower portion of carbonation tank 310. As would be understood in light of the present disclosure, carbonated water outlet 322 may be defined or mounted upstream from a portion of a carbonated water line (e.g., carbonated water line 134—FIG. 8) or carbonated dispenser (e.g., carbonated water outlet 140—FIG. 8) to provide carbonated water thereto.

Figure 12:
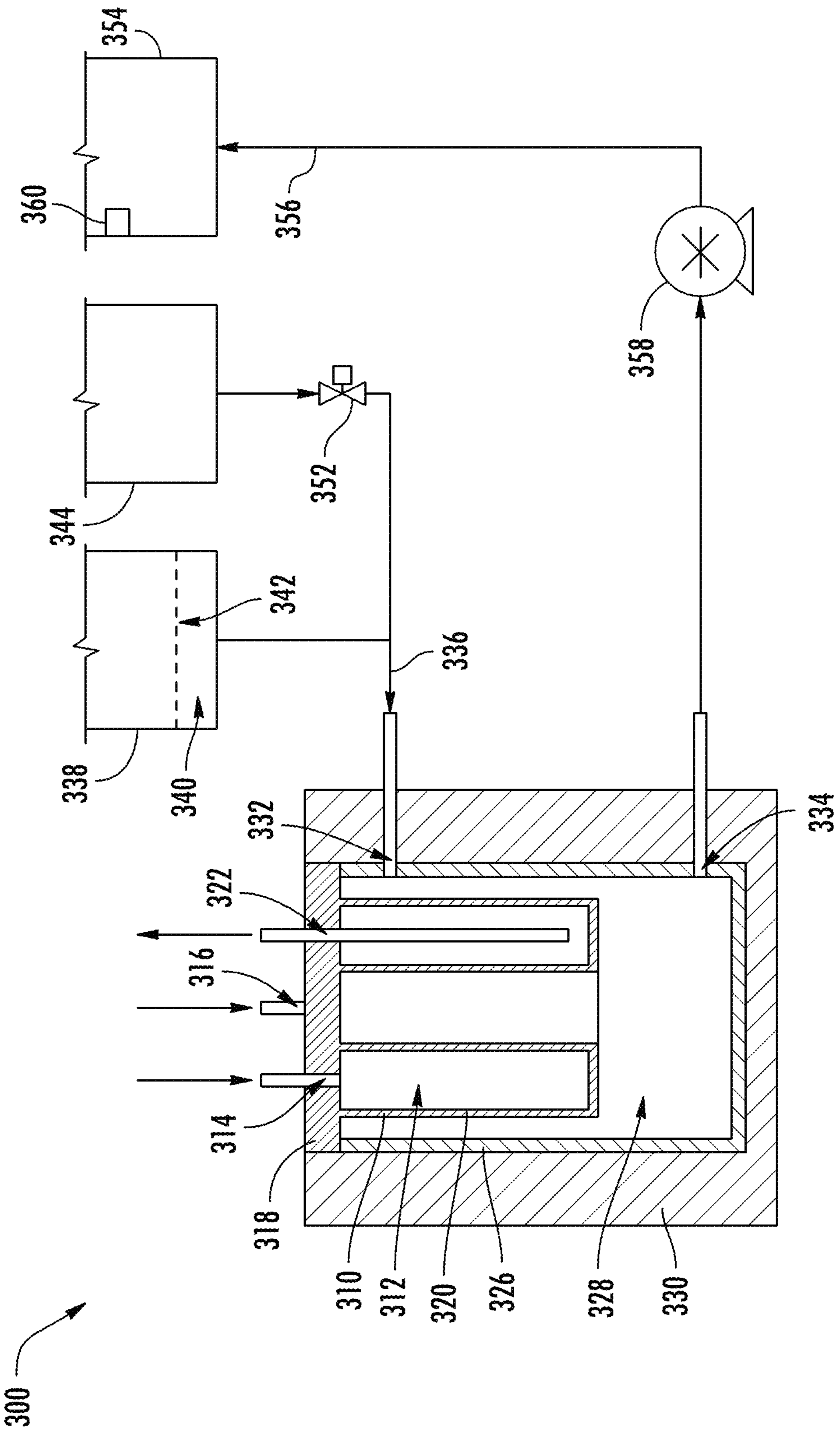
FIG. 12 provides a schematic elevation view of a carbonator assembly of a beverage-dispensing appliance according to exemplary embodiments of the present disclosure.

Turning especially to FIG. 12, carbonator assembly 300 may include a carbonator jacket 326 mounted on, about, or otherwise in thermal communication (e.g., conductive thermal communication) with carbonation tank 310. Generally, carbonator jacket 326 defines a jacket volume 328 that can receive water therein (e.g., separately from the water within tank volume 312). For instance, jacket volume 328 may be defined in fluid isolation from tank volume 312. Tank volume 312 may thus be sealed off from jacket volume 328 such that water is prevented from passing between the two. In some embodiments, jacket volume 328 (or carbonation tank 310 generally) is disposed about carbonation tank 310. For instance, jacket volume 328 may be defined annularly about tank body 320. Additionally or alternatively, tank body 320 may be received, at least in part, within jacket volume 328. Optionally, tank cap 318 may hold carbonator jacket 326 about carbonation tank 310. Additionally or alternatively, tank cap 318 may extend over or across both tank volume 312 and jacket volume 328.

In some embodiments, an insulator cover 330 may be mounted to or otherwise disposed on carbonator jacket 326. Generally, insulator cover 330 may be formed from any suitable thermal-insulating material, such as a rubber, synthetic polymer, etc. In optional embodiments, insulator cover 330 surrounds carbonator jacket 326. For instance, insulator cover 330 may be held directly on an outer surface of carbonator jacket 326.

One or more inlets or outlets may be defined by carbonator jacket 326 to allow water to or from the carbonator jacket 326 (e.g., through insulator cover 330). In particular, a jacket inlet 332 may be defined upstream from the jacket volume 328 to permit water to the jacket volume 328. A jacket outlet 334 may be defined downstream from jacket volume 328 to permit water from the jacket volume 328. As shown, jacket inlet 332 may be disposed above the jacket outlet 334. In turn, water supplied to jacket volume 328 may be received at a relatively higher height than that at which water is drawn from jacket volume 328.

Generally, carbonator jacket 326 is disposed downstream from one or more cold water sources. Specifically, a cold water line 336 may extend to the carbonator jacket 326 (e.g., at jacket inlet 332) in upstream fluid communication with tank volume 312. During use, cold water line 336 may thus direct a cold water flow to the jacket volume 328, which may advantageously cool (i.e., draw heat from) carbonation tank 310. As would be understood, cold water line 336 may be formed from any number of suitable conduits, pipes, containers, etc.

In some embodiments, cold water line 336 extends, at least in part between ice bin 338 (e.g., ice bin 126—FIG. 8) and jacket inlet 332. For instance, cold water line 336 may be in downstream fluid communication with a melt water storage volume 340 (e.g., melt water storage volume 186), such that might receive melt water through a drain aperture 342. Ice bin 338 is generally spaced apart from carbonation tank 310 and carbonator jacket 326, thereby ensuring carbonation tank 310 is held outside of ice bin 338. Nonetheless, as water is melted within ice bin 338 (FIG. 8), such melt water (e.g., having a relatively low temperature) may be directed to jacket volume 328. Thus, drain aperture 342 may be defined upstream from the cold water line 336 to direct melt water thereto. Advantageously, the melt water (e.g., still having a relatively low temperature below that of the ambient environment) within jacket volume 328 may cool (i.e., draw heat from) carbonation tank 310. Optionally, ice bin 338 or melt water storage volume 340 may be mounted above at least a portion of carbonation tank 310 (e.g., at water inlet 314). Additionally or alternatively, downstream from drain aperture 342 or melt water storage volume 340, cold water line 336 may be unobstructed such that no controlled valve or downstream-flow-blocking member is provided thereon. In some such embodiments, melt water may simply flow through cold water line 336 to jacket volume 328 as motivated by gravity.

In additional or alternative embodiments, cold water line 336 extends, at least in part between a chiller, such as a cooling jacket 344 (e.g., cooling jacket 230—FIG. 8) and jacket inlet 332 (e.g., at a separate or parallel branch as the branch of cold water line 336 that extends to melt water storage volume 340). For instance, cold water line 336 may be in downstream fluid communication with cooling jacket 344, which itself may be in thermal communication with ice bin 338 (e.g., as described above). As illustrated, cooling jacket 344 may be spaced apart from carbonation tank 310 and carbonator jacket 326. Nonetheless, chilled water within cooling jacket 344 may be (e.g., selectively) directed to jacket volume 328. Thus, cooling jacket 344 may be defined upstream from the cold water line 336 to direct chilled water thereto. Advantageously, the chilled water (e.g., having a relatively low temperature below that of the ambient environment) within jacket volume 328 may cool (i.e., draw heat from) carbonation tank 310. Optionally, cooling jacket 344 may be mounted above at least a portion of carbonation tank 310 (e.g., at water inlet 314). Additionally or alternatively, downstream from cooling jacket 344, cold water line 336 may have a selectively movable (i.e., selectively opened/closed) line valve 352. Optionally, controller 152 (FIG. 9) may be in operable communication with line valve 352 or otherwise configured to control the movement (i.e., opening and closing) of line valve 352 (e.g., based on one or more detected conditions). When line valve 352 is open, chilled water may flow through cold water line 336 to jacket volume 328 (e.g., as motivated by gravity). Alternately, when line valve 352 is closed, chilled water may be prevented from passing through cold water line 336 or jacket volume 328 generally.

In some embodiments, carbonator jacket 326 is in upstream fluid communication with another portion of appliance 100 (FIG. 8) to supply water thereto (e.g., from jacket volume 328). For instance, a secondary reservoir 354 may be in downstream fluid communication with jacket volume 328 (e.g., at jacket outlet 334). As illustrated, secondary reservoir 354 may be spaced apart from carbonator jacket 326, such as a different horizontal location or relatively higher vertical position. Thus, secondary reservoir 354 may be disposed above carbonator jacket 326. A reservoir water line 356 may extend between carbonator jacket 326 (e.g., at jacket outlet 334) and secondary reservoir 354 to fluidly connect the same.

In certain embodiments, a line pump 358 may is further provided (e.g., along reservoir water line 356) in fluid communication between carbonator jacket 326 and secondary reservoir 354 to actively and selectively motivate water to secondary reservoir 354. Optionally, controller 152 (FIG. 9) may be in operable communication with line pump 358 or otherwise configured to control the activation of line pump 358 (e.g., based on one or more detected conditions). When line pump 358 is active, water may flow through reservoir water line 356 from jacket volume 328 to secondary reservoir 354. Alternately, when line is inactive (e.g., directed to an inactive state), water may be prevented from passing through reservoir water line 356 or to secondary reservoir 354.

Generally, secondary reservoir 354 may be mounted in fluid communication with another portion of the appliance 100 (FIG. 8) to supply water to the same. For instance, as would be understood, secondary reservoir 354 may be provided as supply reservoir upstream from icemaker 124 (FIG. 8) such that icemaker 124 is ensured a steady supply of water during ice making operations. Thus, icemaker 124 may be in downstream fluid communication with secondary reservoir 354 to receive water therefrom. In optional embodiments, a water level sensor 360 is provided on or within secondary reservoir 354 to detect one or more predetermined volumes, heights, or amounts of water within secondary reservoir 354. Such detections may be communicated to controller 152 (FIG. 9) (e.g., in operable communication with water level sensor 360). In additional or alternative embodiments, line pump 358 may be selectively activated to motivate water from the carbonator jacket 326 to the secondary reservoir 354 based on the detected water level. For instance, controller 152 may be configured to selectively activate pump to motivate water to secondary reservoir 354 in response to receiving a detection signal from water level sensor 360 indicating a volume of water within secondary reservoir 354 is below a predetermined threshold. As would be understood, water level sensor 360 may be provided as any suitable volumetric or water-sensing device, such as a float switch, capacitive sensor, resistive sensor, ultrasonic sensor, pressure sensor, etc.

Figure 13:
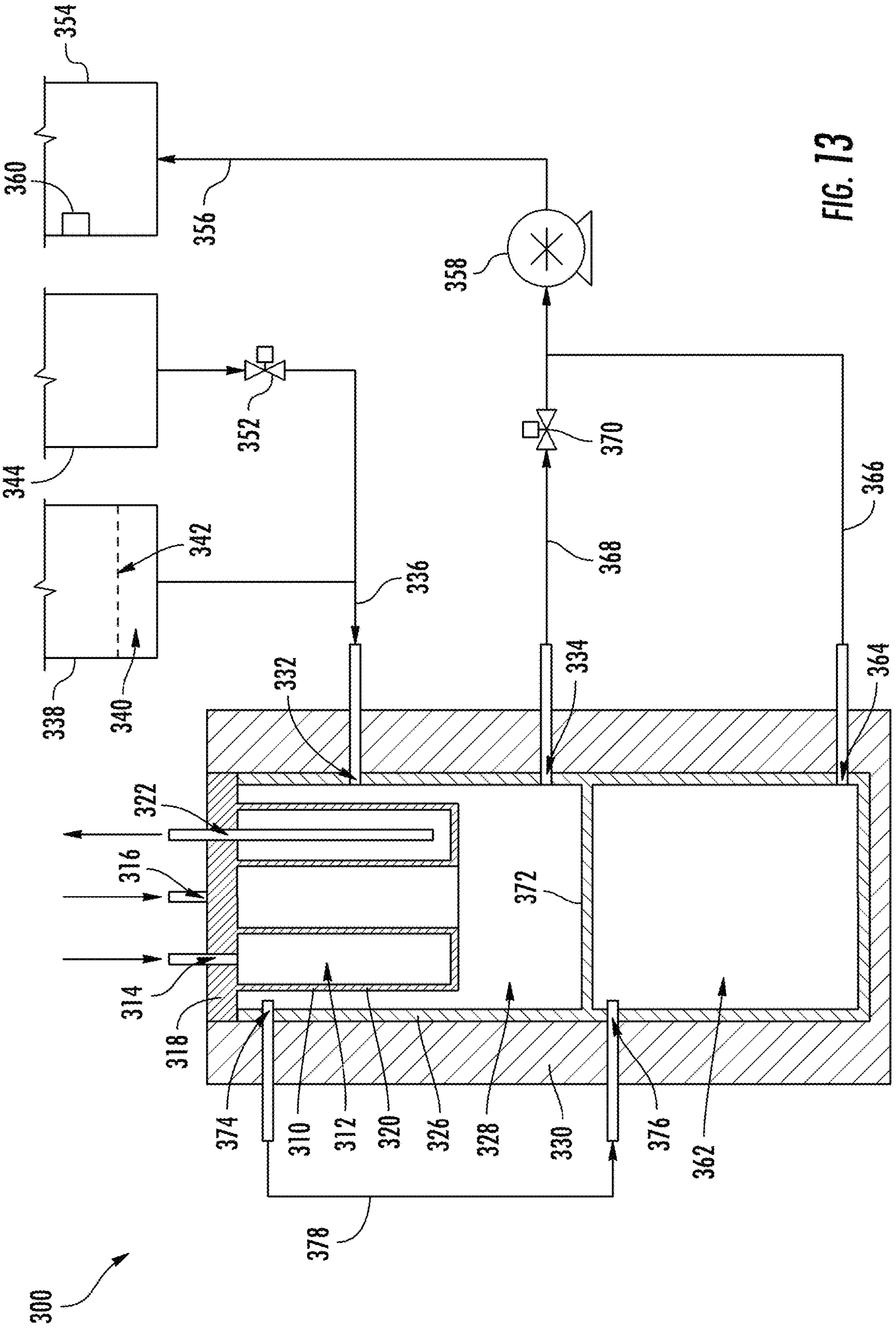
FIG. 13 provides a schematic elevation view of a carbonator assembly of a beverage-dispensing appliance according to other embodiments of the present disclosure.
Figure 14:
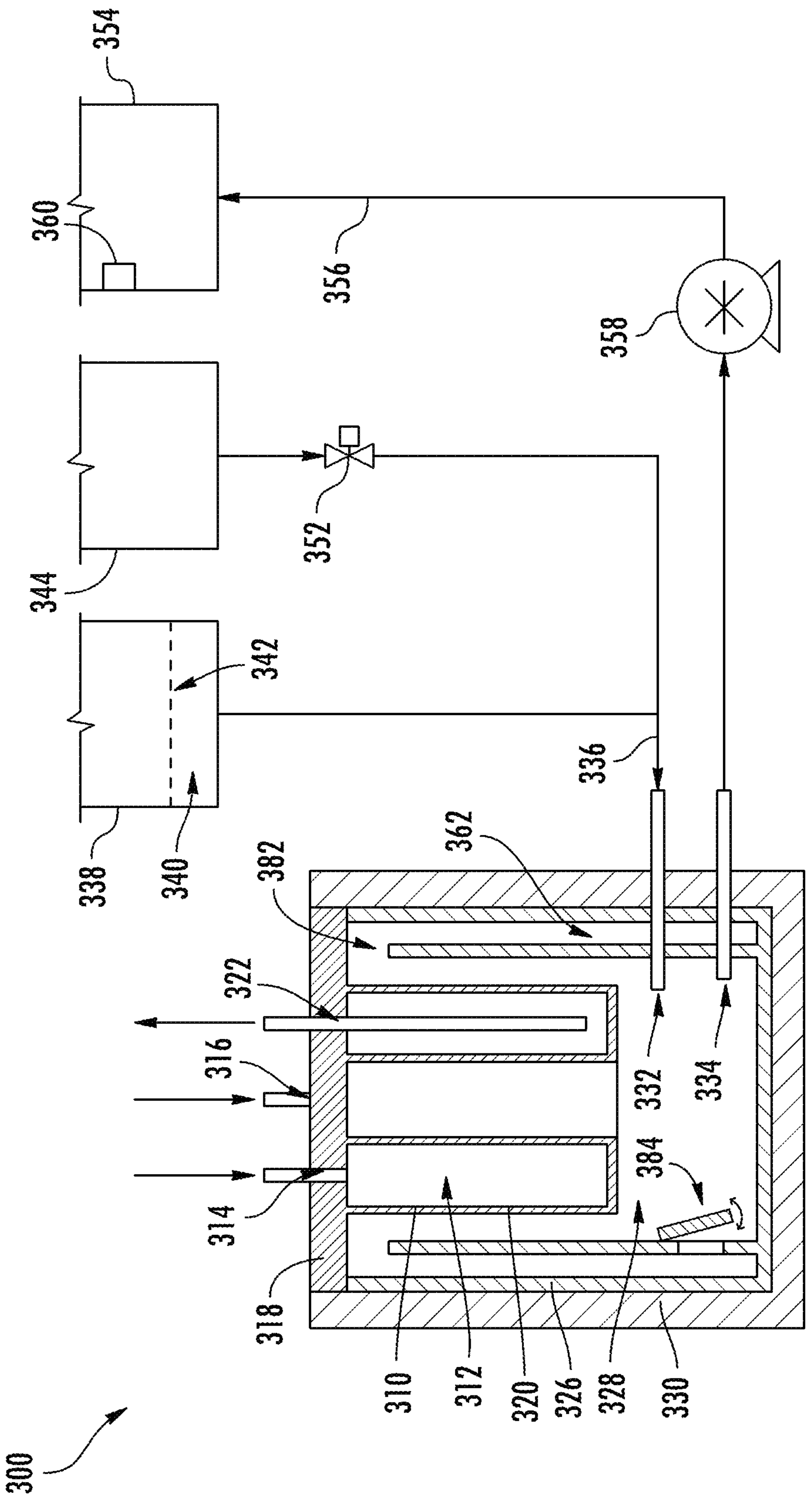
FIG. 14 provides a schematic elevation view of a carbonator assembly of a beverage-dispensing appliance according to yet other embodiments of the present disclosure.

Turning now generally to FIGS. 13 and 14, further exemplary embodiments of carbonator assembly 300. Except as otherwise shown, indicated, or necessitated by the below description, it is understood that the embodiments of FIGS. 13 and 14 are fully described by the above description of the embodiments of FIG. 12 and are not mutually exclusive.

As shown, in certain embodiments, jacket volume 328 is a primary volume in fluid communication with a separate overflow volume 362. Generally, overflow volume 362 is provided downstream from the secondary reservoir 354. Moreover, overflow volume 362 may be upstream from secondary reservoir 354. In turn, water to secondary reservoir 354 may be provided from jacket volume 328 or overflow volume 362 (e.g., as necessitated by the amount of water available from various portions of appliance 100).

In optional embodiments, an overflow outlet 364 is defined downstream from overflow volume 362 and upstream from line pump 358 or secondary reservoir 354. For instance, overflow outlet 364 may connect to reservoir water line 356 (e.g., via first line branch 366). Upstream from the junction of first line branch 366 and a second line branch 368 leading from jacket outlet 334, a branch valve 370 may be mounted to selectively restrict/permit water from jacket volume 328. Controller 152 may be in operable communication with branch valve 370 or otherwise configured to control the movement (i.e., opening and closing) of branch valve 370 (e.g., based on one or more detected conditions). When branch valve 370 is open, chilled water may flow from jacket volume 328 to second line branch 368 and secondary reservoir 354 (e.g., as motivated by activated line pump 358). Alternately, when branch valve 370 is closed (e.g., and line pump 358 is activated), water may be drawn through first line branch 366 from overflow volume 362.

Turning especially to FIG. 13, in some embodiments, at least a portion of overflow volume 362 is defined below jacket volume 328. For instance, a lower wall 372 may separate jacket volume 328 from overflow volume 362. Lower wall 372 may be provided as a solid wall (e.g., extending horizontally and) delineating one or both of the volumes 328, 362. Moreover, lower wall 372 may be vertically disposed between jacket volume 328 and overflow volume 362. A separate outlet (e.g., upper outlet 374) that is defined by carbonation tank 310 apart from jacket inlet 332 may be upstream from overflow volume 362. Upper outlet 374 may be spaced apart from (e.g., above) jacket outlet 334. Additionally or alternatively, upper outlet 374 may be spaced apart from (e.g., above) jacket inlet 332. During operation, water may thus escape jacket volume 328 through upper outlet 374 when a water level within jacket volume 328 rises to the height of upper outlet 374. An intermediary line 378 may connect the tank volume to the overflow volume 362. For instance, intermediary line 378 may extend in fluid communication from upper outlet 374 to an overflow inlet 376 defined below upper outlet 374 upstream from overflow volume 362.

Turning especially to FIG. 14, in some embodiments, at least a portion of overflow volume 362 is defined at a common height with jacket volume 328 (e.g., beside or about jacket volume 328). For instance, an internal wall 380 may separate jacket volume 328 from overflow volume 362. Internal wall 380 may be provided as a solid wall (e.g., extending vertically and) delineating one or both of the volumes 328, 362. Moreover, internal wall 380 may be horizontally disposed between jacket volume 328 and overflow volume 362. As shown, internal wall 380 may define an intermediary passage 382 fluidly connecting the primary volume to the overflow volume 362. For instance, internal wall 380 may terminate at a height below a top end of jacket volume 328. Intermediary passage 382 may be defined by and disposed at the vertical distance between the top of internal wall 380 and an overhead portion of carbonation tank 310. In additional or alternative embodiments, an intermediary valve 384 (e.g., disposed through internal wall 380 below intermediary passage 382) further permits selective fluid communication between jacket volume 328 and overflow volume 362. For instance, intermediary valve 384 may be provided as a flapper valve opened in response to a detected difference in pressure between jacket volume 328 and overflow volume 362. Optionally, only a single jacket outlet 334 (e.g., extending to jacket volume 328) is provided. Additionally or alternatively, jacket inlet 332 may extend directly to jacket volume 328. During operation, water may thus escape jacket volume 328 through intermediary passage 382 when a water level within jacket volume 328 rises to the height of intermediary passage 382. By contrast, when water within jacket volume 328 falls below that of overflow volume 362, intermediary valve 384 may open to permit equalization between the two volumes 328, 362.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A beverage-dispensing appliance comprising:

a carbonation tank defining a tank volume, a water inlet upstream from the tank volume, a carbon dioxide inlet upstream from the tank volume, and a carbonated water outlet downstream from the tank volume;

a carbonator jacket defining a jacket volume disposed about the carbonation tank;

a cold water line extending to the carbonator jacket in upstream fluid communication with the tank volume to direct a cold water flow to the tank volume; and an ice bin spaced apart from the carbonation tank, the ice bin defining a drain aperture upstream from the cold water line to direct melt water thereto.

2. The beverage-dispensing appliance of claim 1, wherein the carbonator jacket further defines a jacket inlet upstream from the jacket volume and downstream from the cold water line, and a jacket outlet downstream from the jacket volume.

3. The beverage-dispensing appliance of claim 2, wherein the jacket inlet is disposed above the jacket outlet.

4. The beverage-dispensing appliance of claim 2, further comprising a secondary reservoir spaced apart from the carbonator jacket, wherein the secondary reservoir is in downstream fluid communication with the jacket outlet.

5. The beverage-dispensing appliance of claim 4, further comprising:

a level sensor disposed within the secondary reservoir to detect a water level thereof, and a pump in upstream fluid communication with the secondary reservoir to motivate water from the carbonator jacket to the secondary reservoir based on the detected water level.

6. The beverage-dispensing appliance of claim 4, further comprising:

an icemaker in downstream fluid communication with the secondary reservoir.

7. The beverage-dispensing appliance of claim 4, wherein the jacket volume is a primary volume, and wherein the carbonator jacket further defines an overflow volume downstream from the jacket inlet and upstream from the secondary reservoir.

8. The beverage-dispensing appliance of claim 7, wherein the carbonator jacket further defines an upper outlet disposed above the jacket inlet, wherein the overflow volume is disposed below the primary volume, and wherein an intermediary line extends from the upper outlet to the overflow volume to fluidly connect the primary volume to the overflow volume.

9. The beverage-dispensing appliance of claim 7, wherein the carbonator jacket further comprises an internal wall separating the primary volume from the overflow volume, the internal wall defining an intermediary passage fluidly connecting the primary volume to the overflow volume.

10. The beverage-dispensing appliance of claim 1, further comprising:

a cooling jacket mounted apart from the drain aperture along the ice bin in conductive thermal communication therewith, the cooling jacket being upstream from the cold water line to selectively direct water thereto.

11. A beverage-dispensing appliance comprising:

a carbonation tank defining a tank volume, a water inlet upstream from the tank volume, a carbon dioxide inlet upstream from the tank volume, and a carbonated water outlet downstream from the tank volume;

a carbonator jacket defining a jacket volume disposed about the carbonation tank, a jacket inlet upstream from the jacket volume, and a jacket outlet downstream from the jacket volume, the jacket inlet being disposed above the jacket outlet;

a cold water line extending to the carbonator jacket in upstream fluid communication with the jacket inlet to direct a cold water flow to the tank volume;

an ice bin spaced apart from the carbonation tank, the ice bin defining a drain aperture upstream from the cold water line to direct melt water thereto; and a pump in downstream fluid communication with the jacket outlet to selectively motivate water from the tank volume.

12. The beverage-dispensing appliance of claim 11, further comprising:

a secondary reservoir spaced apart from the carbonator jacket, wherein the secondary reservoir is in downstream fluid communication with the jacket outlet to receive water from the pump.

13. The beverage-dispensing appliance of claim 12, further comprising:

a level sensor disposed within the secondary reservoir to detect a water level thereof.

14. The beverage-dispensing appliance of claim 12, further comprising:

an icemaker in downstream fluid communication with the secondary reservoir.

15. The beverage-dispensing appliance of claim 12, wherein the jacket volume is a primary volume, and wherein the carbonator jacket further defines an overflow volume downstream from the jacket inlet and upstream from the secondary reservoir.

16. The beverage-dispensing appliance of claim 15, wherein the carbonator jacket further defines an upper outlet disposed above the jacket inlet, wherein the overflow volume is disposed below the primary volume, and wherein an intermediary line extends from the upper outlet to the overflow volume to fluidly connect the primary volume to the overflow volume.

17. The beverage-dispensing appliance of claim 15, wherein the carbonator jacket further comprises an internal wall separating the primary volume from the overflow volume, the internal wall defining an intermediary passage fluidly connecting the primary volume to the overflow volume.

18. The beverage-dispensing appliance of claim 11, further comprising:

a cooling jacket mounted apart from the drain aperture along the ice bin in conductive thermal communication therewith, the cooling jacket being upstream from the cold water line to selectively direct water thereto.

* * * * *